(No Model.)
W. L. CHURCH.
Shaft Coupling.
No. 240,232. Patented April 19, 1881.
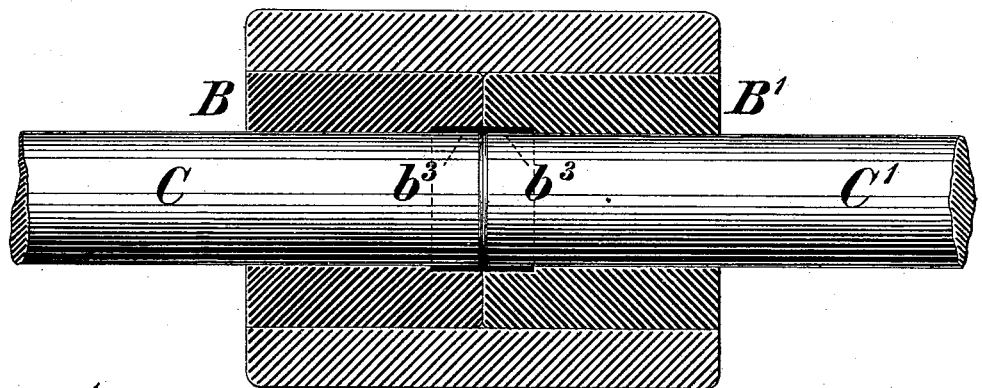
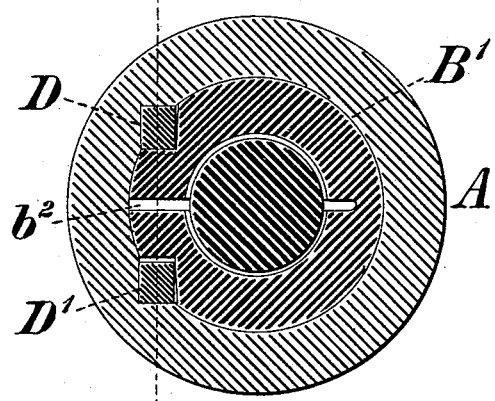
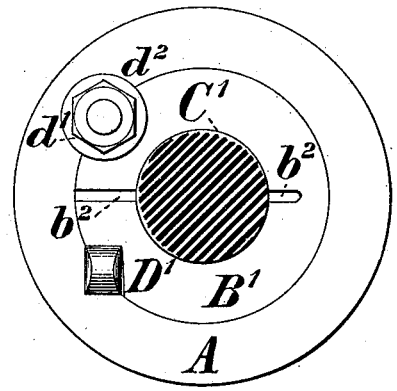
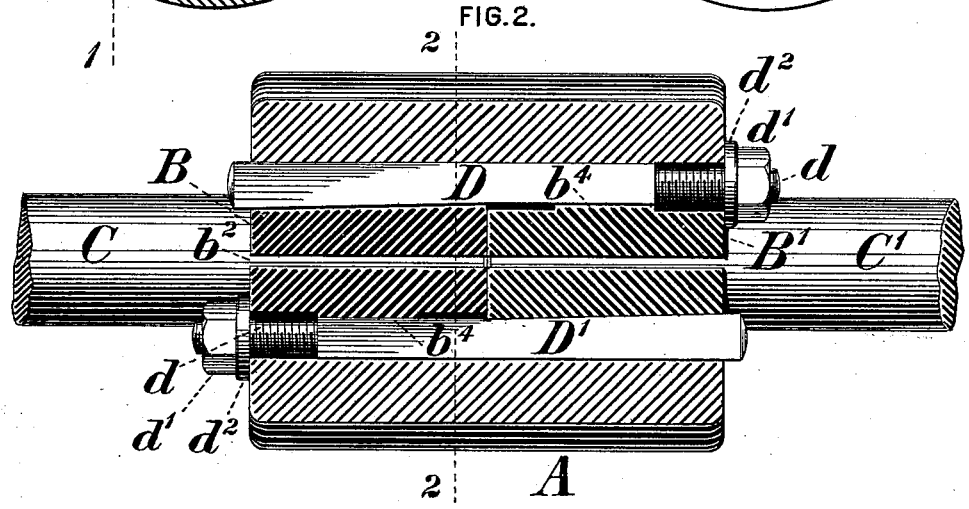
WITNESSES:
Geo. B. Collier
George T. Kelly
INVENTOR
Wm Lee Church,
by Collier & Bell,
attys

UNITED STATES PATENT OFFICE.

WILLIAM LEE CHURCH, OF NEW YORK, N. Y.

SHAFT-COUPLING.

SPECIFICATION forming part of Letters Patent No. 240,232, dated April 19, 1881.

Application filed February 9, 1881. (No model.)

*To all whom it may concern:*

Be it known that I, WILLIAM LEE CHURCH, of New York, in the county of New York and State of New York, have invented certain new and useful Improvements in Shaft-Couplings, of which improvements the following is a specification.

The object of my invention is to furnish a coupling for shafting which shall be simple and comparatively inexpensive in construction, efficient and durable in operation, readily attachable and removable, and adaptable to use as a pulley where required; to which end my improvements consist in certain novel devices and combinations embracing an outer cylindrical inclosing shell or case, two split sleeves fitting within said case and upon the sections of shafting to be connected, and two clamping-keys, by which the split sleeves are compressed, independently one of the other, upon the sections of shafting to which they are applied. The improvements claimed are hereinafter fully set forth.

In the accompanying drawings, Figure 1 is a longitudinal central section through a shaft-coupling embodying my invention; Fig. 2, a similar section at the line 1 1 of Fig. 3; Fig. 3, a transverse section at the line 2 2 of Fig. 2, and Fig. 4 an end view in elevation.

To carry out my invention I provide a shell or case, A, which is turned and bored so as to be truly cylindrical upon both its outer and its inner surfaces, within which are fitted two cylindrical sleeves, B B', the outer diameter of which corresponds substantially with the bore of the shell A, and the inner with that of the sections of shafting C C', which are to be coupled, and which fit within the sleeves B B', the sleeves and shafts abutting, as nearly as may be, midway between the ends of the shell A. Each of the sleeves B B' is split or divided longitudinally by a slot or opening, $b^2$, extending entirely through its metal on one side of its axis, and partially—say about half way—through on the other, so that a connecting web remains, the width of the slot being made sufficiently great to admit of the sleeves being sprung inward to compress and firmly grasp the shafts C C'. A cylindrical recess or chamber, $b^3$, is formed in the inner end of each of the sleeves, admitting of the adjustment of the parts without the necessity of the shafts meeting in the exact center line of the coupling. The sleeves B B' are compressed upon the shafts C C' by two keys, D D', similar in form and fitting in keyways cut partly in the shell A and partly in the sleeves, said keyways being located on that side of the sleeve upon which the latter are cut entirely through, and on each side of and in a plane perpendicular to the dividing-slots $b^2$. Each of the keys D D' is straight on the side which bears against the shell A, and its opposite side is parallel thereto for a portion of its length and inclined or tapering for the balance, the inner sides of the parallel portions of the keys fitting against parallel bearing-faces $b^4$ on the sleeves within the keyways, and the inner inclined sides bearing against the correspondingly-inclined faces of the keyways. A screw-thread, $d$, is formed upon the end of each key adjacent to the parallel portion thereof, and the key is drawn to a bearing against the outer end of the shell A, and the adjacent sleeve, by a nut, $d'$, a washer, $d^2$, being preferably interposed. The keys are arranged within the coupling, "heads and points"—that is, with the wide portion of one opposite the narrow portion of the other, the keyways being, of course, correspondingly formed.

The shell A may, if desired, be extended circumferentially at its ends, so as to cover the projecting ends of the keys D D', and thereby obviate any liability of accident from contact with a belt or other external object.

In the operation of the coupling a sleeve is placed on the end of each shaft, the shell slipped over the sleeves, and the keys inserted, driven, and drawn home. It will be obvious that each sleeve is tightened upon its own shaft independently of the other, and this whether both shafts are of the same or of different diameters. The parallel portion of each key exerts no direct effect in compressing the sleeve against which it bears, simply forming a backing against which the tapered portion of the opposite key draws, thus necessarily effecting the independent compression of the sleeves.

My improved coupling possesses the advantages of containing no conical elements, and hence can be made at comparatively small expense, and involves no waste of the compressing power in friction by its distribution over conical surfaces. It is entirely reliable, owing to the strong compression effected by the combined action of the wedge and screw applied at the point of greatest efficiency—viz., immediately adjacent to the split faces of the sleeve. Further, the slacking of the keys frees the whole coupling, so that it can be readily removed without wedging or binding, and its unbroken cylindrical periphery enables it to be used as a pulley whenever desired.

I claim as my invention and desire to secure by Letters Patent—

1. A clamping-key for shaft-couplings having its bearing-faces parallel for a portion of its length and divergent for the remainder, and provided with a longitudinal threaded extension adjacent to the end at which its bearing-faces are parallel, substantially as set forth.

2. In a shaft-coupling, the combination of a cylindrical outer shell, two independently-adjustable clamping-sleeves fitting therein, each partially divided longitudinally by a transverse slot, two threaded-ended clamping-keys, each of which bears, by parallel faces, upon one of the sleeves and the shell, and bears, by an inclined face, upon the other sleeve, and nuts by which compression is applied to the sleeves through longitudinal movement of the keys, substantially as set forth.

WM. LEE CHURCH.

Witnesses:
J. S. SCHWENDER,
A. G. MATTSSON.